United States Patent Office 2,892,790
Patented June 30, 1959

2,892,790

LUBRICANT COMPOSITION

Frank A. Stuart, Orinda, William T. Stewart, El Cerrito, and Warren Lowe, Berkeley, Calif., assignors to California Research Corporation, San Francisco, Calif., a corporation of Delaware No Drawing. Original application February 3, 1956, Serial No. 563,205. Divided and this application March 14, 1957, Serial No. 645,892

9 Claims. (Cl. 252—56)

This invention relates to a novel lubricant composition, and it is particularly directed to the provision of a lubricant composition which is adapted to be employed in internal combustion engines.

With the refinements now being made in automotive and other internal combustion engines, a great deal of attention is being directed to the provision of a lubricant which will permit the engine to be operated at a high level of efficiency over long periods of time. The primary function of the lubricant is, of course, to reduce friction and thereby not only decrease the wear on pistons, piston walls, bearings and other moving parts, but also increase the efficiency of the engine. Additionally, it is also a function of the lubricant to prevent the deposition of solid products on the piston walls and other surfaces of the engine coming in contact with the lubricant. Such deposits seriously interfere with efficient engine operation for they accelerate piston ring and cylinder wall wear and also increase oil losses by plugging the oil ring grooves. The troublesome deposits which form on the face of the piston and on the other walls of the combustion chamber, as well as on valves and spark plugs are also partially attributable in many cases to the lubricant, and especially to various of the metal-containing additives employed therein. It is of importance to eliminate or at least minimize the formation of all such deposits, and it is the basic object of this invention to achieve such a result.

To a minor degree, certain of the deposits formed on engine surfaces have their origin in the oil itself, that is to say, in the decomposition products of the oil. A more important, though still minor, source of engine deposits lies in the additives with which oils are conventionally supplied. This is particularly the case with metal-containing additives as, for example, the organic, metal-containing salts which are incorporated in the oil to increase the detergency thereof, and the various metal-containing compounds which are added to increase the lubricity of the oil and reduce piston ring and cylinder wall wear. Whenever oil is burned in the engine (as occurs with the oil film present in the cylinder wall during the combustion stroke) any metal-containing additives present in the oil may form an ash which is partially deposited out on the various surfaces of the combustion chamber and on those of the spark plugs and valves. Accordingly, it is a particular object of this invention to provide a lubricant composition which is compounded with metal- or mineral-free detergents and wear-reducing additives.

While certain of the additives heretofore employed in oils (and to a lesser degree the oil itself) are partially responsible for deposits which form on engine surfaces, it is now recognized that the major source of such deposits or their precursors lies in the various aldehydes, acids, oxy-acids and other similarly reactive, partially-oxidized combustion products of the fuel. These products are formed both under pre-ignition conditions as well as during the combustion step proper, particularly during the period before the engine has reached operating temperature. Accordingly, under city driving conditions where the engine is repeatedly started in the cold condition and is seldom driven for a distance sufficient to reach the most efficient operating temperatures, the formation of partial oxidation products is particularly severe. Many of these partial oxidation products are carried down into the crankcase of the engine along with other blow-by gases, and since most are insoluble or only sparingly soluble in lubricating oils, they tend to separate from the oil and adhere to engine surfaces or form large droplets. In either case, under the elevated temperature conditions prevailing in the engine, these reactive monomers quickly polymerize to form solid masses which readily deposit out on the engine wall surfaces.

It is the practice in the art to prevent the formation of such deposits by adding to the lubricant a material normally referred to as a detergent. Insofar as is known, all the detergent additives which have heretofore been successfully employed on a commercial scale are organic, metal-containing compounds such as calcium petroleum sulfonate, calcium cetyl phosphate, calcium octyl salicylate, calcium phenyl stearate, the barium salt of wax-substituted benzene sulfonate, or the potassium salt of the reaction product of phosphorus pentasulfide and polybutene. Various of these detergents act by reacting chemically with deposit precursors to form harmless compounds. Others act to prevent flocculation or coagulation of solid particles in the oil and maintain the same in a state of suspension as finely divided particles. Still others not only perform this dispersant function but also effect the solubilization or emulsification of the sparingly soluble monomers in the oil and thereby greatly reduce the rate of polymerization. In the latter case, such polymer materials as do then form within the body of the oil are smaller in size and can be peptized or dispersed in the oil much more readily than is the case with the large polymeric particles which are formed on exposed engine surfaces or in droplets lying without the oil.

Detergents capable of acting in the latter fashion are preferably employed wherever possible, particularly in automotive engines to be operated under city driving conditions. However, even among the metal-containing additives, few are available which are capable of solubilizing any appreciable amount of all the many types of polymer precursors which are carried into the oil from the fuel. Accordingly, it is a more particular object of this invention to provide a lubricant composition incorporating a metal-free detergent which is capable of solubilizing or emulsifying in the lubricant large amounts of all the various partial oxidation products of the fuel which are carried into the oil, and which is also capable of maintaining in suspension in the oil the various solid polymeric materials which are present therein.

The problem of piston ring and cylinder wall wear, especially the control thereof, is also one which is closely related to the composition of the crankcase lubricant. Aside from abrasive wear, which is caused by dust and dirt and can be remedied by suitable filtering and air-cleaning means, a large part of the wear experienced by piston rings and cylinder wall is attributable to chemical attack by moisture and acidic products originating as by-products of fuel combustion. In engines operated at optimum temperature levels, these combustion products are largely discharged through the exhaust and breather pipe. However, under the relatively "cold" conditions experienced in city driving, and especially at cylinder wall temperatures below about 150° F., the moisture and acid products are condensed on the engine surfaces where they promote corrosive attack and are in a position to work past the piston and accumulate within the engine and in the crankcase oil. This difficulty is one which the art has heretofore met most successfully by supplying the lubricating oil with additives such as the various metal salts of petroleum sulfonic acids and other metal-organic compounds, especially those having a basic reaction. However, this practice has a disadvantage of adding still another metal-containing ingredient to the oil and therefore of increasing the deposit-forming characteristics of the lubricant composition. Accordingly it forms still another object of this invention to provide a lubricant composition containing a metal- or mineral-free additive which effectively decreases the wear experienced by piston rings and cylinder walls, particularly during periods before the engine has become thoroughly warmed to operating temperatures.

The present invention is based on the discovery that certain copolymers, which contain no metal component and therefore are substantially free of any ash-forming tendency, have the ability to impart excellent detergent and antiwear qualities to lubricating oils employed in internal combustion engines. In particular, these copolymers have the ability to solubilize in the oil large amounts of all the various partially oxidized combustion products of the fuels employed in internal combustion engines, while also having the ability of maintaining in a state of suspension any solid polymeric products present in the oil. Additionally, the copolymeric additives of the present invention effectively reduce the wear experienced by piston rings and cylinder wall surfaces even under the most unfavorable operating conditions such as are experienced during the starting and warming up of the engine. These additives have the advantage that they do not combine chemically with the various polymer precursors which are solubilized or dispersed in the oil, nor apparently do they act by a neutralization reaction in counteracting the effect of the various acidic fuel combustion by-products. Accordingly, they are capable of giving excellent protection against engine deposits and wear over extended operating periods. It should also be noted that the copolymeric additives of this invention are non-corrosive to the various bearing metals employed in engines.

Since the additives of the present invention differ in kind from any heretofore proposed for either detergent or antiwear purposes, it would have been surprising to discover that they were effective for either of these purposes. However, that they possessed not one but both of said qualities was altogether unexpected and could not have been predicted.

The polymeric additives of the present invention are copolymers of monomers selected from at least each of the first two classes of the classes consisting of (A) oil-solubilizing compounds having a polymerizable ethylenic linkage and containing a hydrocarbyl group of from 4 to 30 carbon atoms, (B) esters of an acid selected from the group consisting of $\alpha,\beta$-unsaturated monocarboxylic acids of from 3 to 6 carbon atoms each and $\alpha,\beta$-unsaturated-$\alpha,\beta$-dicarboxylic acids of from 4 to 8 carbon atoms with an alcohol wherein at least 50% of the carbon atoms are attached to polar groups selected from the group consisting of hydroxy and amino groups, and (C) acidic compounds selected from the group consisting of $\alpha,\beta$-unsaturated monocarboxylic acids of from 3 to 6 carbon atoms, $\alpha,\beta$-unsaturated-$\alpha,\beta$-dicarboxylic acids of from 4 to 8 carbon atoms, anhydrides thereof and half-esters thereof with an alcohol as defined in (B). Representative copolymers coming within the scope of the present invention are, for example, those of dodecyl methacrylate and pentaerythritol monomethacrylate; 2-ethylhexyl vinyl ether and sorbitan monoacrylate; diisobutylene and 2-hydroxy ethyl methacrylate; dodecyl methacrylate and di-(2-aminoethyl)maleate; di-dodecyl maleate and di-pentaerythritol monomaleate; methallyl oleate and dodecyl sorbitan monomaleate; dodecyl methacrylate, 2-aminoethyl-methacrylate and methacrylic acid; allyl stearate, 2,3-diaminopropyl monomaleate and maleic anhydride; and dodecyl methacrylate, pentaerythritol monomaleate and maleic acid.

The oil-solubilizing monomer portion of the polymeric additives of this invention can be any compound having at least one ethylenic linkage (>C=C<), together with at least one substituent group which contains an oil-solubilizing hydrocarbyl group of from 4 to 30 aliphatic carbon atoms, and which is characterized by the ability to copolymerize through said ethylenic linkage with the polar monomer referred to above in the presence of a suitable catalyst. Alternatively, the oil-solubilizing aliphatic radical can be introduced into the copolymer, as will hereinafter be more fully described. This aliphatic radical, whether present in the original monomer or introduced into the copolymer, imparts oil solubility to the polymer and is preferably a branched or straight-chain alkyl radical or a cycloalkyl radical such as butyl, isobutyl, n-pentyl, n-hexyl, 2-ethylhexyl, decyl, dodecyl, tetradecyl, cyclohexyl, 4-ethylcyclohexyl, or the like, or an alkenyl radical such as oleyl, ricinoleyl, or the like, wherein the ethylenic double bond has substantially no copolymerizing tendency. Oil solubilizing monomers of this general character are well known in the art and are frequently employed as the oil-solubilizing portion of copolymers which are added to lubricating oils to improve the viscosity index and pour point characteristics thereof. They include such materials as olefins and ethylenically unsaturated ethers, esters, ketones, aldehydes, and the like.

The oil solubilizing monomers of component (A) may also be illustrated by the following general formula:

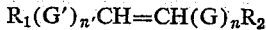

in which $R_1$ and $R_2$ are members of the group consisting of hydrogen and hydrocarbon radicals of from 4 to 30 carbon atoms, at least one of which contains an aliphatic hydrocarbon group of from 4 to 30 carbon atoms as described above, G and G' are members of the class consisting of oxy (—O—), carbonyl

and carbonyloxy

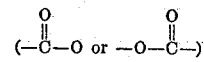

groups and combinations thereof with not more than two alkylene groups of from 1 to 7 carbon atoms each, and $n$ and $n'$ are 0 or 1. When $R_1$ and $R_2$ are hydrocarbon radicals, they may be alkyl, cycloalkyl, alkenyl, cycloalkenyl, aryl, alkaryl or aralkyl in structure, as illustrated by radicals such as 2-ethylhexyl, cyclohexyl, hexenyl, cyclohexenyl, phenyl, naphthyl, tertiary butylphenyl benzyl, etc., with the preferred radicals being as previously mentioned.

Representative oil-solubilizing monomer compounds which can be employed to form the copolymeric additives of the present invention include the following:

OLEFINS

Hexene-1
2-ethylhexene-1
Di- and triisobutylene
Tripropylene
Dodecene-1
Hexadecene-1
Cyclohexene
Octadecene-1
4-octylcyclohexene-1
3-phenylhexadecene-1
p-Octylstyrene
Vinylcyclohexane
2-hexadecylbutadiene-1,3
p-Tertiarybutylstyrene

ETHERS

Vinyl n-butyl ether
Vinyl 2-ethylhexyl ether
Allyl n-butyl ether
Allyl isobutyl ether
Allyl cyclohexyl ether
Allyl 4,4,8,8-tetramethyl-docosyl ether
Methallyl n-hexyl ether
Methallyl n-decyl ether
Methallyl 2-ethylhexyl ether
Methallyl octadecyl ether
Propenyl 2-ethylhexyl ether
Crotyl n-octyl ether
Isopropenyl dodecyl ether
1-decenyl butyl ether
1-eicosenyl decyl ether
Vinyl p-octylphenyl ether
Methallyl p-tert. butylphenyl ether
1-decenyl p-cetylphenyl ether
1-decenyl-2-phenylbutyl ether

ESTERS

| | |
|---|---|
| Vinyl caproate | Cyclohexyl methacrylate |
| Vinyl palmitate | Cyclohexyl 2-dodecenoate |
| Vinyl oleate | Decyl vinylacetate |
| Allyl caprylate | Isooctyl α-chloroacrylate |
| Allyl laurate | p-Isoamylphenyl 2-hexadecenoate |
| Allyl oleate | 4-p-tolylbutyl 2-octadecenoate |
| Allyl palmitate | Undecyl cinnamate |
| Allyl stearate | Methylcyclohexyl 2-ethyl-2-hexenoate |
| Allyl 2-ethylhexanoate | |
| Allyl ricinoleate | 5-ethyldocosyl crotonate |
| Allyl esters of babassu acids | Octadecyl isocrotonate |
| Allyl esters of lard acids | n-Butyl-2-eicosenoate |
| Allyl naphthenate | p-Tert. amylphenyl octadecyl maleate |
| Methallyl caproate | |
| Methallyl naphthenate | p-Hexadecylphenyl 2-ethylhexyl maleate |
| Methallyl ricinoleate | |
| Methallyl p-octylbenzoate | o-Tolyl 2-octadecylcyclohexyl maleate |
| Methallyl oleate | |
| Methallyl cyclohexane carboxylate | o-Nonylphenyl-hexadecyl maleate |
| | Dihexadecyl maleate |
| Methallyl palmitate | Di-methylcyclohexyl maleate |
| Crotyl oleate | Mono-2-ethylhexyl maleate |
| Crotyl naphthenate | Di-2-ethylhexyl maleate |
| α-Methylcrotyl palmitate | Di-dodecyl maleate |
| 1-propenyl naphthenate | Di-dodecyl mesaconate |
| 1-propenyl elaidate | Di-dodecyl citraconate |
| Dodecyl acrylate | o-Tolyl octadecyl itaconate |
| Hexadecyl methacrylate | Mono-hexadecyl itaconate |
| Isobutyl α-decylacrylate | Isopropenyl palmitoleate |
| Vinyl p-n-octyl benzoate | 1-decenyl laurate |
| Allyl 3,5-diisobutyl benzoate | 1-hexadecenyl myristate |

Although any of the oil solubilizing compounds described above will give effective copolymer compositions for lubricant compositions in accordance with the present invention, higher alkyl esters of α,β-unsaturated monocarboxylic acids of from 3 to 6 carbon atoms having alkyl groups of from 8 to 30 carbon atoms are most preferred, both for availability and effectiveness of copolymers prepared from them. Representative acids of this type are the acrylic, methacrylic, crotonic, tiglic, angelic, α-ethylacrylic, α-methylcrotonic, α-ethylcrotonic, β-ethylcrotonic, β-propylcrotonic, and hydrosorbic acids and the like. Even more desirable are the alkyl esters of acrylic and methacrylic acids containing from 10 to 20 carbon atoms in the alkyl groups, since they are found to provide highly superior polymers for the lubricant compositions of the invention and are obtainable in commercial quantities.

Various copolymers employing representative oil-solubilizing monomers of the foregoing types were prepared to illustrate the oil solubilizing effect of the monomers on the resultant copolymers. The solubility of the copolymers in oil and their suitability as lubricating oil additives were demonstrated by incorporating the copolymers into lubricating oils. The lubricant compositions thus obtained were tested to determine their detergency and deposition properties. The results of these tests are given in Table I below.

In the tests the base oil, unless otherwise indicated, is a solvent-refined, wax-free, SAE-30 grade mineral lubricating oil having a viscosity index of 85 which is derived from California waxy crude. Various amounts of the copolymers are incorporated into the oil as indicated in terms of percent by weight.

The Piston Varnish Ratings of the lubricant compositions were obtained by the standard FL-2 test procedure as set out in the June 21, 1948, report of the Coordinating Research Council. In this test the lubricating oil compositions were tested as crankcase lubricants in a 6-cylinder Chevrolet engine, using a low-grade gasoline especially prone to cause engine deposits. At the end of each test the engine was dismantled and the detergency or deposition properties of the lubricant compositions were determined by examining the engine deposits on the piston and visually rating them as to the amount of piston varnish present. The Piston Varnish Ratings of the compositions are given in numerical terms on a scale of 0–10 with "10" representing the complete absence of deposits.

The deposition characteristics of the lubricant compositions containing the copolymeric additives were also determined in the Lacquer Deposition Test. In this test typical engine fuel combustion products were passed into the lubricant compositions and the ability of the lubricant compositions to solubilize and retain the lacquer-forming materials was observed by weighing the amount of lacquer deposits formed on a fresh iron catalytic surface for a standard period of time. The Lacquer Deposit of the lubricant composition is taken as the number of milligrams deposit on the metal surface, and may be correlated directly to the Piston Varnish Rating obtained in the standard FL-2 test procedure outlined in the above paragraph.

Both the FL-2 test procedure and the Lacquer Deposition Test are more fully described in the disclosure which follows with regard to the particular lubricant composition of the present invention.

*Table I*

| Lubricant composition | Ratio of (1) monomer to (2) monomer to (3) monomer | Piston varnish rating | Lacquer deposit (milligrams) | Piston varnish rating (estimated from lacquer deposit) |
|---|---|---|---|---|
| Base oil alone | | 3.0 | 850 | |
| 2.8% (1) dodecyl methacrylate, (2) N,N'-di-2-hydroxy-ethyl maleamide | 20/1 | | 450 | 5.0 |
| 2.8% (1) dodecyl methacrylate, (2) allyl stearate, (3) maleic anhydride | 20/1/1 | | 405 | 5.2 |
| 1.5% (1) dodecyl methacrylate, (2) N-(2-hydroxyethyl) methacrylamide | 7/1 | 6.3 | | |
| 3.0%* (1) tridecyl methacrylate, (2) octadecyl methacrylate, (3) monododecyl ether of hexadecaethylene glycol ᵃ methacrylate | 10/6/1 | 8.4 | | |
| 2.5% (1) allyl stearate, (2) didodecyl maleate, (3) di-(hydroxyethyl) ethylenediamine salt of monododecyl maleate | 5/5/2 | 5.5 | | |
| 2.8% (1) vinyl ethylhexoate, (2) itaconic acid | 15/1 | | 500 | 4.5 |
| 2.8% (1) vinyl stearate, (2) maleic anhydride, (3) monododecyl ether of pentaethylene glycol ᵇ methacrylate (4) methacrylamide | 30/1/2/1 | | 325 | 6.0 |
| 2.5% (1) allyl stearate, (2) ethylene glycol monooleate monomaleate, (3) mono-N,N'-di(2-hydroxy-ethyl) ethylenediamine maleate (salt) | 5/4/1 | 4.0 | | |
| 2.8% (1) octadecene, (2) monododecyl maleate, (3) monopentaerythritol maleate | 2/1/1 | | 500 | 4.5 |
| 2.8% (1) hexene-1, (2) dodecyl methacrylate, (3) methacrylic acid, (4) monododecyl ether of eicosaethylene glycol ᶜ methacrylate | 25/25/1/4 | | 400 | 5.5 |
| 2.8% (1) di-2-ethylhexyl fumarate, (2) octadecene-1, (3) crotonic acid, (4) monotridecyl ether of decaethylene glycol ᵈ methacrylate | 25/25/8/2 | | 570 | 4.0 |
| 2.8% (1) allylethyl ether, (2) vinyl stearate, (3) itaconic acid, (4) monododecyl ether of decaethylene glycol ᵈ crotonate | 14/50/7/3 | | | |
| 3.0% (1) vinyl 2-ethylhexyl ether, (2) tetradecylphenyl maleate, (3) dodecyl maleate, (4) maleic acid | 6/3/1/2 | 4.6 | | |
| 1.5% (1) dodecyl acrylate, (2) monododecyl ether of decaethylene glycol ᵈ acrylate (3) acrylic acid | 780/9/1 | 5.6 | | |
| 1.5% (1) hexadecyl styrene, (2) methacrylic acid | 5.8/1 | 5.9 | | |

*In 140 Neutral Mineral Lubricating Oil from solvent-refined waxy California crude.
ᵃ Polyethylene glycol of 704 M.W.
ᵇ Polyethylene glycol of 220 M.W.
ᶜ Polyethylene glycol of 880 M.W.
ᵈ Polyethylene glycol of 440 M.W.

From the above test data it will be seen that all of the various oil-solubilizing monomers representative of the aforementioned types were effective in the production of useful, copolymeric lubricating oil additives which are capable of preventing deposits from lubricant compositions under typical engine operating conditions. These monomers, as previously described, constitute a definite, recognized class of compounds which have been used heretofore in the art in the production of polymeric lubricating oil additives of the nonpolar type, such as V.I. improvers and pour point depressants. Although the results demonstrate beyond any reasonable doubt that suitability of the different oil-solubilizing monomers within the terms of the description in the production of oil soluble copolymers, it should be understood that the efficacy of each individual class of copolymers as detergents is primarily dependent upon the particular polar or functional group in the so-called polar monomer and its relationship to the rest of the copolymer.

Since the functionality of the individual polar groups differs and is largely empirical in nature, no conclusion is intended to be drawn concerning equivalency of the various copolymeric lubricating oil additives employed as detergents in this illustration. The polar groups of the particular class of copolymers of the compositions of this invention and their balance or relationship to the remainder of the copolymers are more fully discussed in the disclosure which follows, along with additional examples of the invention.

As indicated above, suitable polar group containing monomer components of the copolymeric additives employed in the practice of this invention include esters of an acid selected from the group consisting of $\alpha,\beta$-unsaturated monocarboxylic acids of from 3 to 6 carbon atoms each, and $\alpha,\beta$-unsaturated-$\alpha,\beta$-dicarboxylic acids of from 4 to 8 carbon atoms with an alcohol, wherein at least 50% of the carbon atoms are attached to polar groups selected from the group consisting of hydroxy and amino groups. Preferably, at least 2 of the carbon atoms are attached to the aforesaid polar groups. The term amino, as employed herein in connection with said polar groups, embraces not only the —$NH_2$ group proper, but also the groups —$NHR_1$ and —$NR_1R_1$ where $R_1$ is a hydrocarbon radical which can be either unsubstituted, or substituted by one or more of the aforesaid polar groups. Representative ester compounds which can be employed as the polar monomer in forming the copolymeric additives are those formed by esterifying an acid such as acrylic, methacrylic, crotonic, tiglic, angelic, maleic, fumaric, mesaconic, citraconic, itaconic, or the like, or an anhydride thereof, if any, with a polar substituted alcohol of the type defined above. Such alcohols include, by way of example, ethylene glycol, ethanolamine, 1,2-propylene glycol, sorbitol, mannitol, glucose, erythritol, pentaerythritol, dipentaerythritol, tripentaerythritol, 3,5-dihydroxycyclohexanol, hydroxyethylethylenediamine, diethanolamine, triethanolamine, N,N'-dihydroxyethyl ethylenediamine, 2-aza-propanol, and the like. In the case of polymers containing polybasic acids, such as maleic acid, for example, it is possible to employ mixed esters where at least 20% of the carboxyl groups of the polymer are ester-linked to a polar substituted alcohol of the defined type, while the remaining carboxyl groups or anhydride groups, if any, may exist as such or may be ester-linked with hydrocarbyl radicals which can be either unsubstituted or substituted by one or more of the aforesaid polar groups.

Representative polar monomer components which can be employed in the copolymers of this invention are:

2-hydroxyethyl methacrylate
2-hydroxyethyl acrylate
2-hydroxyethyl crotonate
2-hydroxyethyl tiglate
Di-(2-hydroxyethyl) maleate
2-aminoethyl acrylate
2-aminoethyl methacrylate
2-hydroxypropyl methacrylate
3-hydroxypropyl methacrylate
2,3-dihydroxypropyl acrylate
2,3-dihydroxypropyl methacrylate
Di-(2,3-hydroxypropyl) maleate
Di-(2,3-hydroxypropyl) citroconate
Methyl 2-hydroxyethyl maleate
Phenyl 2-hydroxethyl maleate
2-aminoethyl 2-hydroxyethyl maleate
3-oxa-5-hydroxypentyl acrylate
3-oxa-5-hydroxypentyl methacrylate
Erythritol monoacrylate
Erythritol monomethacrylate
Erythritol monocrotonate
Di-(erythritol) monomaleate
Pentaerythritol monoacrylate
Pentaerythritol monomethacrylate
Pentaerythritol monocrotonate
Pentaerythritol monotiglate
Pentaerythritol monoangelate
Di-(pentaerythritol) monomaleate
Di-(pentaerythritol) monofumarate
Cyclohexyl pentaerythritol monomaleate
Dipentaerythritol monomethacrylate
Tripentaerythritol monomethacrylate
Sorbitol monoacrylate
Sorbitol monomethacrylate
Di-(sorbitol) monomaleate
Mannitol monomethacrylate
Arabitol monomethacrylate
Inositol monomethacrylate
2,2,6,6-tetramethylolcyclohexanol monomethacrylate
3-aza-5-aminopentyl methacrylate
N-(2-aminoethyl)-3-aza 5-hydroxypentyl methacrylate
3-aza-5-hydroxypentyl methacrylate
Di-(3-aza-5-hydroxypentyl) maleate
Sucrose monomethacrylate
3,6-dihydroxycyclohexyl methacrylate
2-aza-propyl methacrylate
3,5-dihydroxyphenyl methacrylate
Sorbitan monomethacrylate
2,2-dimethylolbutyl methacrylate Within the class of polar monomers described above, a preferred class is made up of esters of methacrylic or maleic acid with aliphatic polyhydric alcohols or amino alcohols, e.g., ethanolamine, diethanolamine, ethylene glycol, pentaerythritol, glucose, 2,2,6,6-tetramethylolcyclohexane, and the like. A still more preferred class of polar monomers comprises the esters of methacrylic or maleic acid with straight- or branched-chain alkyl polyhydric alcohols of not more than 20 carbon atoms as, for example, ethylene glycol, glycerin, sorbitol, sorbitan, pentaerythritol, or the like.

As already mentioned, the acidic compound of component (C) of the copolymer, when present, is an $\alpha,\beta$-unsaturated monocarboxylic acid of from 3 to 6 carbon atoms, an $\alpha,\beta$-unsaturated-$\alpha,\beta$-dicarboxylic acid of from 4 to 8 carbon atoms, anhydrides thereof, and half-esters thereof with an alcohol as defined in connection with component (B). These esters, their anhydrides, if any, and the polar group substituted alcohols from which their half-esters are formed are of the general character as defined and illustrated in the foregoing discussion with respect to the (B) monomers. Examples of the half-esters which have not been already illustrated include mono(2-hydroxyethyl) maleate, mono(2-aminoethyl) maleate, mono(2-hydroxypropyl) maleate, mono(3-hydroxypropyl) maleate, mono(2,3-dihydroxypropyl) maleate, mono(2-aza-5-hydroxypentyl) maleate, mono(erythritol) monomaleate, mono(pentaerythritol) monomaleate, mono(dipentaerythritol) monomaleate, monosorbitol monomaleate, mono-arabitol monomaleate, mono(2,2,6,6-tetramethylolcyclohexanol) monomaleate, mono(3-aza-5-aminopentyl) maleate, mono(N-(2-aminoethyl)-3-aza-5-hydroxypentyl) maleate, mono(3-aza-5-hydroxypentyl) maleate, monosucrose monomaleate, mono(3,6-dihydroxycyclohexyl) maleate, mono(2-aza-propyl) maleate, mono(3,5-dihydroxyphenyl) maleate, mono(2,2-dimethylolbutyl) maleate, mono(2-hydroxyethyl) fumarate, mono(pentaerythritol) monofumarate, mono-sorbitol monofumarate, mono(3-aza-5-hydroxypentyl) fumarate, mono(pentaerythritol) citraconate, mono(2-hydroxyethyl) citraconate, mono(2-aminoethyl) mesaconate, mono(pentaerythritol) monomesaconate.

Component (C) is preferably an $\alpha,\beta$-unsaturated monocarboxylic acid of from 3 to 6 carbon atoms, or an $\alpha,\beta$-unsaturated-$\alpha,\beta$-dicarboxylic acid of from 4 to 8 carbon atoms of the aforementioned types. Methacrylic or maleic acid are considered particularly suitable in combination with their respective derivatives in the polar group substituted (B) monomers.

In the various (A), (B), and (C) monomers employed in the copolymers of the lubricant compositions according to this invention, it will be apparent from the above description that certain monomers of the $\alpha,\beta$-unsaturated-$\alpha,\beta$-dicarboxylic acid type may contain oil solubilizing groups, having from 4 to 30 and, preferably, 8 to 30 carbon atoms as previously mentioned, along with a polar group of the type such as a carboxylic acid group or a polar substituted alkyl ester group. Representative monomers of this type include octadecenyl pentaerythritol monomaleate, octadecyl 2-hydroxyethyl maleate, dodecyl pentaerythritol monomaleate, tolyl-2-hydroxyethyl maleate, cyclohexyl pentaerythritol monomaleate, phenyl 2-hydroxyethyl maleate, dodecyl pentaerythritol monofumarate and 2-ethylhexyl 2-hydroxyethyl fumarate.

The copolymers of this invention are soluble in hydrocarbon mineral oils to the extent of at least 2% by weight, and preferably to the extent of at least 10% by weight. The requisite degree of oil-solubility, coupled with good detergency and anti-wear characteristics, is possessed by those copolymers of the type described herein wherein the (A) and (B) monomers are present in the ratio of one monomer unit of (B) for each 1 to 20 monomer units of the aforedescribed (A) component. When acid component (C) is present, however, then the total number of (B) and (C) monomer units should not exceed the aforementioned ratio of the (B) component to the (A) component. Within these limits, in the case of the preferred acid and ester copolymers, those copolymers are preferably employed wherein there is present one carboxyl hydroxy or amino group containing monomer unit for each 3 to 15 ester-linked hydrocarbyl radicals of the type which contain a group of from 4 to 30, preferably, 8 to 30 aliphatic carbon atoms and are capable of imparting oil-solubility to the polymer. In other words, in the case of a copolymer made up of dodecyl methacrylate, 2-ethylhexyl 2-hydroxyethyl maleate and mono(2-hydroxyethyl) maleate, the preferred copolymer would contain a total of from 3 to 15 ester-linked alkyl groups (this total being obtained by adding the number of dodecyl and 2-ethylhexyl groups present) for each carboxyl or hydroxy alkyl group.

The copolymers of this invention can be prepared by one or more of the variety of different methods which are known in the art. As regards the reactants per se, there can be employed either the given monomer materials which are to form the copolymer, or there can be employed monomer reactants which are converted to the desired monomer units by appropriate treatment of a copolymer intermediate. Thus, a copolymer of the A-B variety as, for example, that of dodecyl methacrylate and di(2-hydroxyethyl) maleate can readily be formed either by copolymerizing the two monomers or by copolymerizing dodecyl methacrylate and maleic anhydride and then esterifying the anhydride groups in the copolymer with ethylene glycol. In another case of copolymers of the A-B types employing monocarboxylic acids, a copolymer of dodecyl methacrylate and pentaerythritol monomethacrylate can be prepared by (1) directly copolymerizing the two monomers; or (2) copolymerizing dodecyl methacrylate with methacrylic acid, with the free carboxyl groups in the resulting copolymer then being esterified by treating the copolymer with pentaerythritol; or (3) copolymerizing methacrylic acid and pentaerythritol monomethacrylate, with the free carboxyl groups in the copolymer then being esterified by treating the copolymer with dodecyl alcohol; or (4) starting with a homopolymer of dodecyl methacrylate, subjecting the polymer to partial hydrolysis and then esterifying the resulting free carboxyl groups with pentaerythritol. In the case of dibasic acid esters, much the same alternatives are available, it also being possible here in some cases to employ the acid anhydride as a copolymerizing reactant, if desired. Other possible variations in the nature of the reactants and in the selection of a suitable reaction path may also suggest themselves to those skilled in the art. The same holds true as regards any esterification procedures employed in forming the copolymer desired. Again, an A-B-C copolymer as, for example, that of dodecyl methacrylate, di(2-hydroxyethyl) maleate and mono(2-hydroxyethyl) maleate can be formed either by copolymerizing the three monomers or by first copolymerizing dodecyl methacrylate and maleic anhydride and then esterifying more than 50% and less than 100% of the anhydride in the resulting polymer with ethylene glycol.

Having selected the desired monomeric reactants, the copolymer of this invention can be prepared by conventional bulk, solution or emulsion methods of addition polymerization in the presence of an addition polymerization initiator. Preferably, however, the copolymerization is effected in an inert organic solvent such as benzene, toluene, xylene or petroleum naphtha in the presence of a free radical-liberating type of initiator such as a peroxy compound, for example, benzoyl peroxide, acetyl peroxide, tert.-butyl hydroperoxide, di-tert. butyl peroxide, dibenzoyl peroxide, or di-tert. amyl peroxide, or an azo initiator such as 1,1'-azodicyclohexanecarbonitrile, or $\alpha,\alpha'$-azodiisobutyronitrile. The catalyst, or polymerization initiator, can be employed in an amount of from about 0.1 to 10%, with a preferred range being from about 0.25 to 2%. If desired, the catalyst can be added in increments as the reaction proceeds. Likewise, additional portions of the solvent can also be added from time to time in order to maintain the solution in a homogeneous condition. The temperature of copolymerization varies from about 75 to 150° C., with the optimum temperature depending on the solvent selected, the concentration of monomers present therein, the catalyst selected, and the time of the reaction. Much the same conditions prevail when the copolymerization is effected in bulk rather than in the presence of an inert solvent. The copolymers formed by such methods, which are useful in a practice of the present invention, have an apparent molecular weight of at least 2,000, and preferably of at least 20,000. Molecular weights of from 100,000 to 1,000,000 are most suitable from the standpoint of viscosity and other physical properties.

In a preferred application of the copolymeric lubricating oil detergent additives of the present invention in mineral lubricating oil, it has been noted that a certain optimum relationship between the total number of aliphatic carbon atoms to polar groups within the molecule appears to exist. Evidence has been obtained that for a given concentration the copolymer compositions containing a ratio of aliphatic carbon atoms to polar groups within the range of from 50 to 225, preferably 75 to 125, appear to embrace the optimum composition for deposit reduction effectiveness. In determining this apparent balance between the polar and non-polar constituents, the aliphatic carbon atoms to be considered are the following:

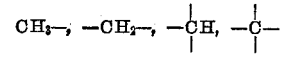

and excluding aromatic ring carbon atoms or the carbon atom of the carbonyl groups. As polar groups, the following representative radicals are included: —OH (either acid, alcohol or phenol),

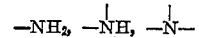

and an acid anhydride group as a single unit.

Although this concept of copolymer compositions appears to correlate generally with their performance in all of the oils of lubricating viscosity, there may be additional composition factors which alter the effect of these improving agents in various types of lubricating oil systems and service. However, on the basis of these assumptions, it becomes evident that variations in the aliphatic carbon to polar ratio and hence performance efficacy may be accomplished by the choice of the acid derivative radical and degree of neutralization in the modification of polar components (B) and (C).

Typical methods for preparing the copolymers which can be employed with success as detergents and anti-wear oxidants in lubricant compositions are given in the following examples.

EXAMPLE I

In this operation a homopolymer of dodecyl methacrylate having an apparent molecular weight of about 20,000 was employed as the starting material from which was prepared a copolymer of dodecyl methacrylate and pentaerythritol monomethacrylate. The preparation was as follows: A solution of 14 grams of potassium hydroxide in 300 cc. of 2-ethylhexanol was prepared, and to this solution was added 800 cc. of a 40% solution in mineral oil of the methacrylate homopolymer, this amount of KOH constituting a slight excess over that theoretically required to effect the desired saponification of approximately 15% of the ester groups present in the polymer. The resulting solution was heated to 320° F. and maintained at this temperature, with stirring, for 10 hours. To this solution was then added 50 cc. of benzene along with a 50% excess of 6 N HCl over the amount theoretically required to liberate the free carboxyl groups from the corresponding salt. The acidified solution was then refluxed for 8 hours, after which it was cooled, diluted with ethyl ether, and water washed (along with a small amount of ethyl alcohol to break the emulsion) until neutral to litmus. The solution was then placed in a steam bath to remove the ether and thereafter distilled in vacuo until a pot temperature of 350° F. at 3 mm./Hg was reached in order to remove the 2-ethylhexanol and the dodecyl alcohol present.

The dodecyl methacrylate/methacrylic acid copolymer prepared as described above was then dissolved in 300 cc. of xylene, along with 0.15% (based on the weight of the polymer) of toluene sulfonic acid and a 50% excess of pentaerythritol over the amount theoretically required to esterify the free carboxyl groups in the copolymer. This solution was then refluxed for 8 hours while distilling off, as an azeotrope with xylene, the water formed during the esterification reaction. The solution of the ester so obtained was then water-washed several times, with the emulsion formed in each washing step being broken with ethyl alcohol. The ester was then dried over sodium sulfate, filtered through Celite Filter Aid, and stripped of its xylene content. The ester copolymer so obtained was in the form of an oil-soluble, semigel.

EXAMPLE II

In this operation, the same procedure was employed as described in Example I above except that here the pentaerythritol was replaced by tripentaerythritol, thereby forming an oil-soluble dodecyl methacrylate/tripentaerythritol monomethacrylate copolymer.

EXAMPLE III

This operation was also conducted in the manner described in Example I insofar as concerns the preparation of the dodecyl methacrylate/methacrylic acid copolymer. In this case, however, this copolymer was dissolved in a mixed xylene-toluene solvent along with 0.15% of toluene sulfonic acid and a solution of ethanolamine hydrochloride in propanol, this salt being added only in the amount theoretically required to form the ester and not in excess. The resulting solution was then refluxed until esterification was complete (as indicated by the absence of water in the azeotrope), water-washed to remove the HCl introduced with the amine salt, dried, filtered and stripped of its solvent content in the manner described in Example I. There was recovered, in the form of an oil-soluble, semigel, a copolymer of dodecyl methacrylate and 2-aminoethyl methacrylate wherein the respective monomer components were present in the ratio of approximately 7:1.

EXAMPLE IV

In this example a 40% by weight concentrate of the copolymer of tridecylmethacrylate, octadecylmethacrylate and ethylene glycol monomethacrylate in mineral lubricating oil was prepared. The procedure was similar to that employed in the above examples. 104 gr. of tridecylmethacrylate, 85.4 g. of octadecylmethacrylate and 16.2 g. of ethylene glycol monomethacrylate were mixed with 312 g. of benzene, along with 0.7 g. of benzoyl peroxide. The mixture was refluxed at about 203° F. for 7½ hours. 294 g. of a 140 neutral mineral lubricating oil were then added. The benzene was stripped off to yield 490 g. of product consisting of 40% by weight of the copolymer of tridecylmethacrylate, octadecylmethacrylate, and ethylene glycol monomethacrylate having a 3/2/1 monomer ratio in mineral lubricating oil. The product was used as a concentrate in the blending of detergent lubricant compositions.

EXAMPLE V 389 g. (1.53 moles) of lauryl methacrylate, 7.5 g. (0.076 mole) of maleic anhydride, and 10 cc. of benzene were charged to a three-necked flask fitted with a stirrer, thermometer, reflux condenser, and dropping funnel. The mixture was heated to 220-225° F. with stirring. A solution of 3 g. of benzoyl peroxide and 3 g. of tertiarybutyl hydroperoxide in 60 cc. of benzene was then added over a period of 6 hours after which time the mixture was kept at 205° F. for approximately 18 hours. The product was stripped to 370° F. at 1 ml. mercury pressure to give 375 g. of a viscous, oil-soluble polymer which was shown by analyses to contain lauryl methacrylate and maleic anhydride in a molar ratio of approximately 20:1.

87 g. of the lauryl methacrylate-maleic anhydride copolymer, 9.3 g. (0.068 mole) pentaerythritol (3.5 fold excess for 50% esterification of available acid), 0.2 g. p-toluene sulfonic acid monohydrate, 160 g. of phenol, and xylene were charged to a three-necked flask fitted with a stirrer, thermometer, reflux condenser, and water receiver. The mixture was stirred and heated at reflux, 345° F., for a period of 10½ hours. It was cooled and then taken up in 1 liter of diethyl ether. The ether solution was washed with three 400 cc. portions of a 5% sodium chloride solution, and then dried over anhydrous sodium sulfate. Solvents were then stripped from the mixture and the recovered product was shown by analysis to contain a lauryl methacrylate maleic anhydride copolymer in which 41% of the available acid was esterified with pentaerythritol.

EXAMPLE VI 425 g. (2.5 moles) of vinyl 2-ethylhexoate, 21.7 g. (0.167 mole) itaconic acid, and 60 cc. of butanone were charged to a three-necked flask fitted with a stirrer, thermometer, reflux condenser, and dropping funnel. The mixture was heated to 220-225° F. with stirring. A solution of 8.9 g. of benzoyl peroxide in 90 cc. of butanone was added dropwise over a period of 7 hours during which time the temperature was maintained between 220° and 230° F. by heating or cooling as required. Another 2.2 g. of catalyst in 25 cc. of butanone were added, the mixture was thoroughly stirred and then let stand for approximately 18 hours at 190° F.

Approximately 400 cc. of benzene were added to one-fifth of the reaction mixture and the polymer was precipitated with 5 volumes of methanol. The isolated polymer was shown by analysis to contain vinyl 2-ethylhexoate and itaconic acid in a molar ratio of approximately 15:1.

40 g. of the vinyl 2-ethylhexoate-itaconic acid copolymer, 0.48 g. (0.005 mole) of ethanolamine hydrochloride, 0.2 g. of p-toluene sulfonic acid monohydrate, 200 g. of phenol, and xylene were charged to a three-necked flask fitted with a stirrer, thermometer, reflux condenser, and water receiver. The mixture was heated at reflux temperature, 230-235° F., for a period of 9 hours. Solvents were then stripped from the reaction mixture and the product was dissolved in 750 cc. of diethyl ether. The solution was extracted with a caustic solution containing 0.43 g. of sodium hydroxide in 300 cc. of water. The ether solution was washed with two 300 cc. portions of water and then dried over anhydrous sodium sulfate. The solvent was removed by distillation and the analyses of the recovered product indicated that 25% of the total acid in the vinyl 2-ethylhexoate-itaconic acid copolymer was esterified with β-aminoethyl groups.

EXAMPLE VII 389 g. (1.53 moles) of lauryl methacrylate, 7.5 g. (0.076 mole) of maleic anhydride, and 10 cc. of benzene were charged to a three-necked flask fitted with a stirrer, thermometer, reflux condenser, and dropping funnel. The mixture was heated to 220-225° F. with stirring. A solution of 3 g. of benzoyl peroxide and 3 g. of tertiarybutyl hydroperoxide in 60 cc. of benzene was then added over a period of 6 hours after which time the mixture was kept at 205° F. for approximately 18 hours. The product was stripped to 370° F. at 1 ml. mercury pressure to give 375 g. of a viscous, oil-soluble polymer shown by analyses to contain lauryl methacrylate and maleic anhydride in a molar ratio of approximately 20:1.

150 g. of the lauryl methacrylate maleic anhydride copolymer, 14 g. (0.118 mole) of N-methyl diethanolamine (one-fold excess for 100% esterification of available free acid), 0.3 g. of p-toluene sulfonic acid monohydrate and xylene were charged to a three-necked flask fitted with a stirrer, thermometer, reflux condenser, and water receiver. The mixture was stirred and heated at reflux temperature, 300° F., for a period of 6 hours. After this time sufficient xylene was withdrawn to give a refluxing temperature of 345° F. The reaction mixture was maintained at this temperature for an additional 6 hours. 368 g. of lubricating oil was added and the xylene and unreacted N-methyl diethanolamine were stripped from the reaction mixture to give a 30% concentrate of the polymeric derivative. Analyses indicated approximately 50% of the available free acid in the lauryl methacrylate-maleic anhydride copolymer was esterified with N-methyl diethanolamine.

In general, excellent detergent and antiwear properties can be imparted to lubricating oils by dissolving therein a quantity of from about 0.1 to 10% by weight of the copolymers of the type described above, although a preferred range is from about 0.4 to 5% by weight. The copolymeric additives of this invention can be used with good effect in the case of any one of a wide variety of oils of lubricating viscosity, or of blends of such oils. Thus, the base oil can be refined Pennsylvania or other paraffin base oil, a refined naphthenic base oil, or a synthetic hydrocarbon or non-hydrocarbon oil of lubricating viscosity. As synthetic oils there can be mentioned alkylated waxes and similar alkylated hydrocarbons of relatively high molecular weight, hydrogenated polymers of hydrocarbons, and the condensation products of chlorinated alkyl hydrocarbons with aromatic compounds. Other suitable oils are those which are obtained by polymerization of lower molecular weight alkylene oxides such as propylene and/or ethylene oxide. Still other synthetic oils are obtained by etherification and/or esterification of the hydroxy groups in alkylene oxide polymers such as, for example, the acetate of the 2-ethylhexanol-initiated polymer of propylene oxide. Other important classes of synthetic oils include the various esters as, for example, di(2-ethylhexyl) sebacate, tricresyl phosphate and silicate esters. If desired, the oil can be a mixture of mineral and synthetic oils.

While satisfactory lubricant compositions can be obtained by adding to the base oil employed only one or more of the copolymeric additives of the type described above, it also falls within the purview of this invention to provide lubricant compositions which contain not only such copolymers, but also other additives such as pour point depressants, oiliness and extreme pressure agents, antioxidants, corrosion inhibiting agents, blooming agents, thickening agents, and/or compounds for enhancing the temperature-viscosity characteristics of the oil. The present invention also contemplates the addition to the lubricant composition (particularly when the amount of copolymer employed is relatively small) of auxiliary detergents and/or antiwear agents.

The efficacy of copolymeric additives of the type described above as detergents and antiwear agents in lubricating oils is illustrated by data from a number of tests. In the tests from which the data is obtained the base oil unless otherwise specified, is a solvent-refined, wax-free SAE-30 grade mineral lubricating oil having a viscosity index of 85 which is derived from California waxy crude. Various amounts of the copolymeric additives are incorporated into the oil as noted in terms of percent by weight.

In the Lacquer Deposition Test the low temperature detergency of the oils tested is measured by determining the ability of the oil to solubilize and retain typical engine fuel deposits and precursors thereof which are formed due to incomplete combustion of the fuel. Retention of these deposits in a given oil depends upon their dispersal and upon minimizing their polymerization to lacquer.

Briefly described, the Lacquer Deposition Test involves condensing fresh cool flame oxidation products from a standard test fuel simulating the fuel combustion products of an internal combustion engine in a steel vessel containing a certain amount of the lubricating oil being tested. The steel surface of the vessel acts as an iron catalyst for polymerization of the fuel oxidation products to lacquer in the same manner as the steel surfaces in an internal combustion engine. After the oxidation products have been condensed, the steel vessel containing the lubricating oil is heated for 24 hours at a temperature selected to correspond with actual engine conditions. The test oil is then decanted while hot from the lacquer deposits formed in the steel vessel due to polymerization and the lacquer deposits are de-oiled and weighed.

In the actual test a low grade gasoline is employed of the type described in connection with the standard FL-2 test procedure given below. The gasoline at a rate of 13.3 cc. per hour is vaporized and mixed with air, the air rate being 1.75 liters per minute. The vapor mixture of gasoline and air is then fed into an elongated cool flame combustion chamber of standard design having a diameter of 1½ inches. The cool flame combustion chamber is maintained at 695° F. The test is continued for 1 hour during which the oxidation products issuing from the cool flame combustion chamber are condensed into the weighed steel catalyst vessel which contains 30 g. of the oil being tested at about room temperature. The steel vessel containing test oil and condensed oxidation products is then heated for 24 hours at 110° F. The oil is decanted from the lacquer deposits in the vessel, following which the deposits are de-oiled by washing with petroleum solvent. The increase in wieght of the steel vessel due to the lacquer deposits is then determined and recorded in milligrams as "LD" or "Lacquer Deposit."

The Lacquer Deposit for any given lubricant composition obtained in accordance with the procedure described above is directly correlated to the "Piston Varnish Rating" or "PVR" obtained for the same lubricant composition in the standard FL-2 test procedure previously referred to and hereinafter more particularly described. Table II which follows gives the correlated values for both the Lacquer Deposits and Piston Varnish Ratings.

*Table II*

| LD | PVR | LD | PVR |
|---|---|---|---|
| 140 | 9.5 | 335 | 6.0 |
| 170 | 9.0 | 370 | 5.5 |
| 190 | 8.5 | 420 | 5.0 |
| 220 | 8.0 | 480 | 4.5 |
| 245 | 7.5 | 570 | 4.0 |
| 275 | 7.0 | 700 | 3.5 |
| 305 | 6.5 | 850 | 3.0 |

The correlated values in the above table provide an accurate means for estimating from the Lacquer Deposits determined for a given oil the Piston Varnish Rating to be obtained in the standard FL-2 Chevrolet engine test.

In the test where the Piston Varnish Ratings are obtained, a given lubricating oil composition is tested as the crankcase lubricant in a 6-cylinder Chevrolet engine using a low grade gasoline especially prone to cause engine deposits, the conditions being those defined in the standard FL-2 test procedure as described in the June 21, 1948 report of the Coordinating Research Council. This procedure requires the maintenance of a jacket temperature of 95° F. and a crancase oil temperature of 155° F. at 2500 r.p.m. and 45 brake horsepower of 40 hours, and therefore closely simulates the relatively "cold" engine conditions which are normally experienced in city driving. At the end of each test, the engine is dismantled and the amount of negine deposits on the piston determined and expressed as the Piston Varnish Rating. This value is obtained by visually rating (on a scale of 0 to 10, with 10 representing the absence of any deposit) the amount of deposit on each piston skirt and averaging the individual ratings so obtained for the various pistons. Under the conditions of this test, a Piston Varnish Rating of 4.5 is indicative of satisfactory performance, though preferably this rating should be 5 or above. The wear experienced by the piston rings during the test is also measured in certain cases and expressed in mgs. of metal lost per hour. 5 mgs. per hour is regarded as satisfactory, though preferably the loss should be 3 mgs. or less per hour. In the case of the base oil alone without the addition of any additives it is found that the Piston Varnish Rating is approximately 3.0 and the piston ring weight loss is 5.5 mgs./hr. On the other hand, as indicated by the data presented in Table III below, when the base oil is compounded with the indicated amounts of a copolymer, greatly superior results are obtained.

Table III

| Lubricant composition | Ratio of (1) monomer to (2) monomer to (3) monomer | Piston varnish rating | Lacquer deposit (milligrams) | Piston varnish rating (estimated from lacquer deposit) | Piston ring wear rate, mg./hr. |
|---|---|---|---|---|---|
| Base Oil Alone | | 3.0 | 850 | | 5.0 |
| 2.5% (1) allyl stearate, (2) didodecyl maleate and (3) dodecyl pentaerythritol maleate in base oil | 8/1/3 | 5.2 | | | |
| 2.5% (1) allyl stearate, (2) didodecyl maleate, and (3) dodecyl ethylene glycol maleate in base oil | 16/5/3 | | | | 4.2 |
| 1.1% (1) dodecyl methacrylate and (2) pentaerythritol monomethacrylate in base oil | 7/1 | 5.9 | | | 1.4 |
| 1.5% (1) dodecyl methacrylate and (2) pentaerythritol monomethacrylate in base oil | 10/1 | 5.0 | | | 2.0 |
| 1.5% (1) dodecyl methacrylate and (2) pentaerythritol monomethacrylate in base oil | 14/1 | 4.4 | | | 3.5 |
| 1.5% (1) dodecyl methacrylate and (2) tripentaerythritol monomethacrylate in base oil | 7/1 | 4.6 | | | 2.4 |
| 1.5% (1) dodecyl methacrylate and (2) 2-hydroxyethyl methacrylate in base oil | 7/1 | 6.7 | | | 2.0 |
| 1.5% (1) dodecyl methacrylate and (2) 2-aminoethyl methacrylate in base oil | 7/1 | 5.8 | | | 2.8 |
| Base oil alone | | | 850 | 3.0 | |
| 2.8% (1) dodecyl methacrylate, (2) monopentaerythritol monomaleate, and (3) maleic anhydride in base oil* | 200/4/1 | | 425 | 5.0 | |
| 2.8% (1) vinyl-2-ethylhexoate, (2) mono-2-aminoethyl itaconate and (3) itaconic acid in base oil* | 40/1/1 | | 394 | 5.4 | |
| 2.8% (1) dodecyl methacrylate, (2) mono-3-methyl-3-aza-pentane-(1, 5)-diolmonomaleate in base oil* | 20/1 | | 340 | 5.9 | |
| 2.8% (1) octadecene, (2) didodecyl maleate, (3) dodecyl monopentaerythritol maleate, and (4) dodecyl acid maleate in base oil* | 20/6/10/3 | | 500 | 4.4 | |

*140 Neutral mineral lubricating oil from solvent refined waxy California crude.

The utility of still other lubricant compositions in accordance with the invention in which various representative oils of lubricating viscosity are employed is illustrated by the additional examples given in the following table.

Table IV

| Lubricant Composition | Base oil | Ratio of (1) monomer to (2) Monomer to (3) Monomer | Viscosity at 100° F., SSU | Viscosity at 210° F., SSU | Viscosity Index |
|---|---|---|---|---|---|
| Base oil alone | Mixed hexyl-octyl orthosilicate | | 45.19 | 33.52 | 183 |
| 2.8% (1) Dodecyl methacrylate, (2) monopentaerythritol, monomaleate, and (3) maleic anhydride in base oil | do | 200/4/1 | 51.4 | 36.26 | 232 |
| 2.8% (1) Vinyl-2-ethyl-hexoate, (2) mono-2-aminoethyl itaconate, and (3) itaconic acid in base oil | do | 40/1/1 | 55.84 | 36.78 | 216 |
| 2.8% (1) Dodecyl methacrylate, and (2) mono-3-methyl-3-aza-pentane-(1,5)-diol monomaleate in base oil | do | 20/1 | 69.16 | 43.05 | 226 |
| Base oil alone | Octyloxyoctapropylene glycol acetate | | 86.64 | 39.81 | 170 |
| 2.8% (1) Dodecyl methacrylate, (2) monopenta-erythritol monomaleate, and (3) maleic anhydride in base oil | do | | 108.8 | 44.22 | 171 |
| 2.8% (1) Vinyl-2-ethyl-hexoate, (2) mono-2-aminoethyl itaconate, and (3) itaconic acid in base oil | do | | 116.1 | 44.3 | 163 |
| Base oil alone | Dioctyl phthalate | | 139.8 | 40.28 | 10 |
| 2.8% (1) Dodecyl methacrylate, (2) monopentaerythritol monomaleate, and (3) maleic anhydride in base oil | do | 200/4/1 | 204.2 | 46.82 | 99 |
| 2.8% (1) Vinyl-2-ethylhexoate, (2) mono-2-aminoethyl itaconate and (3) itaconic acid in base oil | do | 40/1/1 | 208.2 | 46.6 | 93 |
| 2.8% (1) Dodecyl methacrylate, (2) mono-3-methyl-3-aza-pentane-(1,5)-diol monomaleate in base oil | do | 20/1 | 387.8 | 69.69 | 137 |

From the tests of the foregoing table it will be seen that each of the illustrative compositions containing the copolymeric lubricating oil additives according to the invention possess improved lubricating properties compared to the base oils alone.

In the foregoing description of the invention, the term

"hydrocarbyl" is used with reference to the class of organic groups commonly known as "hydrocarbon groups." As employed herein, this term is considered to be a more convenient and concise generic expression for describing said hydrocarbon groups.

This application is a division of Stuart, Stewart and Lowe patent application Serial No. 563,205 filed February 3, 1956, which in turn is a continuation-in-part of Stuart, Stewart and Lowe patent application Serial Number 316,316, filed October 22, 1952, and now abandoned; Stewart, Stuart and Lowe patent application Serial Number 328,153, filed December 26, 1952, and now abandoned; Lowe, Stewart and Stuart patent application Number 328,267, filed December 27, 1952, and now abandoned; and Stuart, Stewart and Lowe, patent application Serial Number 363,652, filed June 23, 1953, and now abandoned.

We claim:

1. A lubricant composition comprising a major portion of an oil of lubricating viscosity and a minor portion, sufficient to enhance the detergent characteristics of the composition of a copolymer of monomers selected from at least each of the first two classes of the classes consisting of (A) polymerizable oil-solubilizing compounds having a single ethylenic linkage and containing a monovalent hydrocarbon group of from 8 to 30 carbon atoms, (B) esters selected from the group consisting of esters of α,β-ethylenically unsaturated monocarboxylic acids of from 3 to 6 carbon atoms each and diesters of α,β-ethylenically unsaturated-α,β-dicarboxylic acids of from 4 to 8 carbon atoms with an alkyl alcohol wherein at least 50% of the carbon atoms and not less than two thereof are attached to hydroxy groups, and (C) acidic compounds selected from the group consisting of α,β-ethylenically unsaturated monocarboxylic acids of from 3 to 6 carbon atoms, α-β-ethylenically unsaturated-α-β-dicarboxylic acids of from 4 to 8 carbon atoms, anhydrides of said dicarboxylic acids and monoesters of said dicarboxylic acids with an alcohol as defined in (B), said monomers being present in the copolymer in the ratio of from about 1 to 20 monomer units of the oil-solubilizing compound (A) for each monomer unit of the ester (B) and the acidic compound (C), there being present at least one monomer unit of said (B) component and said copolymer having a molecular weight of at least 2,000.

2. A lubricant composition comprising a major portion of an oil of lubricating viscosity, together with from about 0.1 to 10% by weight of a copolymer of (A) a polymerizable oil-solubilizing compound which has a single ethylenic linkage and a group of from 8 to 30 aliphatic carbon atoms, and (B) a monoester of methacrylic acid with an alkyl alcohol wherein at least 50% of the carbon atoms, and not less than two thereof, are attached to hydroxy groups; said components being present in the copolymer in the ratio of from about 3 to 15 monomer units of the oil-solubilizing compound (A) for each monomer unit of the ester (B), there being present at least one monomer unit of said (B) component and said copolymer having a molecular weight of at least 2,000.

3. A lubricant composition comprising a major portion of an oil of lubricating viscosity, together with from about 0.1 to 10% by weight of a copolymer of (A) a polymerizable oil-solubilizing compound which has a single ethylenic linkage and a group of from 8 to 30 aliphatic carbon atoms, (B) a monoester of an α,β-ethylenically unsaturated monocarboxylic acid of from 3 to 6 carbon atoms with an alkyl alcohol wherein at least 50% of the carbon atoms, and not less than two thereof, are attached to hydroxy groups, and (C) an α,β-ethylenically unsaturated monocarboxylic acid of from 3 to 6 carbon atoms; said components being present in the copolymer in the ratio of from 3 to 15 monomer units of the oil-solubilizing compound (A) for each monomer unit of the ester (B) and the ester (C), there being present at least one monomer unit of each of said (B) and (C) components and said copolymer having a molecular weight of at least 2,000.

4. A lubricant composition comprising a major portion of an oil of lubricating viscosity, together with from about 0.1 to 10% by weight of a copolymer of (A) a higher alkyl methacrylate having from 8 to 30 carbon atoms in the alkyl group, and (B) a monoester of methacrylic acid with an alkyl alcohol wherein at least 50% of the carbon atoms, and not less than two thereof, are substituted by hydroxy groups; said components being present in the copolymer in the ratio of from about 3 to 15 monomer units of the ester component (A) for each monomer unit of the ester compound (B), there being present at least one monomer unit of said (B) component and said copolymer having a molecular weight of at least 2,000.

5. A lubricant composition comprising a major portion of an oil of lubricating viscosity, together with from about 0.1 to 10% by weight of a copolymer of (A) a higher alkyl methacrylate having from 8 to 30 carbon atoms in the alkyl group, and (B) a half-ester of maleic acid with an alkyl alcohol wherein at least 50% of the carbon atoms, and not less than 2 thereof, are substituted by hydroxy groups; said components being present in the copolymer in the ratio of from about 3 to 15 monomer units of the ester component (A) for each monomer unit of said half-ester component (B), there being present at least one monomer unit of said (B) component and said copolymer having a molecular weight of at least 2,000.

6. A lubricant composition comprising a major portion of an oil of lubricating viscosity together with from about 0.1 to 10% by weight of a copolymer of (A) a higher alkyl methacrylate containing from 8 to 30 carbon atoms in the alkyl group, (B) a monoester of methacrylic acid and an alkyl alcohol wherein at least 50% of the carbon atoms, and not less than two thereof, are substituted by hydroxy groups and (C) methacrylic acid; said components being present in the present in the copolymer in the ratio of from 3 to 15 monomer units of the (A) component for each monomer unit of the (B) and (C) components, there being present at least one monomer unit of each of the (B) and (C) components in the copolymer, said copolymer having a molecular weight of at least 2,000.

7. A lubricant composition comprising a major portion of an oil of lubricating viscosity, together with from about 0.1 to 10% by weight of a copolymer of (A) a higher alkyl methacrylate having from 8 to 30 carbon atoms in the alkyl group, and (B) pentaerythritol monomethacrylate; said components being present in the copolymer in the ratio of from about 3 to 15 monomer units of the ester component (A) for each monomer unit of the ester component (B), there being present at least one monomer unit of said (B) component and said copolymer having a molecular weight of at least 2,000.

8. A lubricant composition comprising a major portion of an oil of lubricating viscosity, together with from about 0.1 to 10% by weight of a copolymer of (A) a higher alkyl methacrylate having from 8 to 30 carbon atoms in the alkyl group, and (B) 2-hydroxy ethyl methacrylate; said components being present in the copolymer in the ratio of from about 3 to 15 monomer units of the ester component (A) for each monomer unit of the ester component (B), there being present at least one monomer unit of said (B) component and said copolymer having a molecular weight of at least 2,000.

9. A lubricant composition comprising a major portion of an oil of lubricating viscosity, together with from about 0.1 to 10% by weight of a copolymer of (A) a higher alkyl methacrylate having from 8 to 30 carbon atoms in the alkyl group, (B) pentaerythritol monomethacrylate, and (C) methacrylic acid; said components being present in the copolymer in the ratio of from about 3 to 15 monomer units of the (A) component for each monomer unit of the (B) and (C) components, there being present at least one monomer unit of each of said (B) and (C) components in the copolymer and said copolymer having a molecular weight of at least 2,000.

References Cited in the file of this patent

UNITED STATES PATENTS

| | | |
|---|---|---|
| 2,615,845 | Lippincott et al. | Oct. 28, 1952 |
| 2,616,853 | Giammaria | Nov. 4, 1952 |
| 2,637,698 | Tutwiler | May 5, 1953 |
| 2,728,751 | Catlin et al. | Dec. 27, 1955 |
| 2,737,496 | Catlin | Mar. 6, 1956 |